July 6, 1948.                     C. H. RICHARDS                    2,444,530
                 TORQUE RESPONSIVE CLUTCH FOR CONTROLLING
Filed March 9, 1943   SHIFTING OF GEAR RATIOS OF TRANSMISSIONS
                                                          5 Sheets-Sheet 3

Inventor:
Carroll H. Richards

July 6, 1948.  C. H. RICHARDS  2,444,530
TORQUE RESPONSIVE CLUTCH FOR CONTROLLING
SHIFTING OF GEAR RATIOS OF TRANSMISSIONS
Filed March 9, 1943  5 Sheets-Sheet 4

Inventor:
Carroll H. Richards

July 6, 1948.

C. H. RICHARDS 2,444,530

TORQUE RESPONSIVE CLUTCH FOR CONTROLLING
SHIFTING OF GEAR RATIOS OF TRANSMISSIONS

Filed March 9, 1943

Inventor:
Carroll H. Richards

Patented July 6, 1948

2,444,530

UNITED STATES PATENT OFFICE 2,444,530

TORQUE RESPONSIVE CLUTCH FOR CONTROLLING SHIFTING OF GEAR RATIOS OF TRANSMISSIONS

Carroll H. Richards, Boston, Mass.

Application March 9, 1943, Serial No. 478,494

9 Claims. (Cl. 192—31)

This invention relates to an automotive transmission which includes driving and driven elements and automatic change speed or shifting mechanism responsive to the ratios of the driving and resisting torques of the driving and driven elements for automatically shifting to transmission of power through a lower or higher gear ratio as required by said torque ratios, and which provides a positive driving and hold-back connection between the driving and driven elements, and a quiet over-riding clutch.

My Patent No. 2,039,451, dated May 5, 1936, discloses a change speed mechanism in which the driving element is a hollow drum. A freely rotatable torque balancer, having formed on its peripheral surfaces a plurality of cam like surfaces, has a roller operatively associated with each cam surface. The driven element is provided with a plurality of projections each extending adjacent the periphery of the balancer and adapted to engage one of the rollers.

When the drum, the driving element, is in driving connection, it tends to rotate the rollers, which in turn tend to rotate the balancer to cause the rollers to be wedged between the inner surface of the drum and the cam-like surfaces of the balancer, and since the rollers engage the projections of the driven element, the latter is connected in driving relation with the driving element. This is the shifting or change speed mechanism and the drive is transmitted from the driving element through the rollers and torque baalncer to the driven element.

This driving connection can be made or disrupted by a sufficient change in torque ratio between the driving and driven elements. This change of torque ratios means the value of the ratios to which the shifting mechanism is responsive to cause a connection or the disruption of the connection of the driving and driven elements.

Such a shifting mechanism is interposed in the direct and intermediate speeds drive of the transmission and each constitutes an automatic shifting mechanism to effect a driving therethrough when the parts are caused to function due to the existing value of torque ratio for which they are designed to be responsive. Consequently the operator of the vehicle could shift through the various speeds by changing the torque ratio value between the driving and driven elements by suitable manipulation of the clutch and throttle.

My application for Patent Serial No. 420,978, filed November 29, 1941, now Patent No. 2,341,- 946, granted February 14, 1944, contemplates a shifting mechanism of the general character above described and an auxiliary mechanism associated with it. In this invention, this auxiliary mechanism functions practically the same as it does in the shifting mechanism with which it is described in the abovementioned application. It controls the shifting mechanism at the making and breaking of the driving connection of the driving and driven elements according to these elements' relative speeds, and stabilizes the driving connection between the driving and driven elements when this connection exists. It controls the duration of the disruption of the drive in respect to the relative speeds of the driving and driven elements and controls the duration of the potential driving relation, the potential disruption relation, the actual driving connection and the actual disruption relation of the driving and driven elements. Furthermore, it controls the duration of the potential hold-back relation and the actual hold-back relation when they exist in the shifting mechanism. In every case it controls functions in respect to the relative speeds of the driving and driven elements of the shifting mechanism.

The present invention contemplates a change speed mechanism, whose shifting of speeds is effected by mechanism responsive to the value of the torque ratio of the driving and driven elements at the time of the shifting of speeds and is accomplished in much the same manner as the mechanism disclosed in my Patent No. 2,039,- 451, dated May 5, 1936.

The mechanism in this invention is more particularly adapted to heavy self-propelled vehicles, such as heavy busses, heavy trucks, Army tanks and Diesel-driven railway trains.

An object of this invention is to transmit a smooth drive regardless of the weight of the vehicle, without dissipating the kinetic energy of the vehicle except in a negligible way; whereas heretofore to have and maintain a smooth drive, particularly in heavy self-propelled vehicles, such as Diesel-driven trains, the smoothness of the drive was obtained by dissipating the greater part of the kinetic energy of the vehicle.

Another object of the invention is to secure a smooth drive automatically by permitting a driving connection between the driving and driven elements only when their resisting and driving torques are such that there will be no disruption to the smoothness of the drive and by making and breaking of the driving connections not under load.

Another object of the invention is to permit driving connections to be made automatically between the driving and driven elements only when the differences in speed of these elements will not disrupt the smoothness of the drive if driving connections are made between them.

Another object of the invention is to secure an over-riding clutch having a positive drive, yet to be quiet when over-riding. Heretofore all positive drive over-riding clutches were noisy and caused excessive wear of their positive driving connections when over-riding; and over-riding clutches which were quiet when over-riding were not positive in their driving connection, but have depended on friction.

Another object of the invention is to provide a shifting mechanism whose operation is responsive to the value of the torque ratio of its driving and driven elements, that is not available to make or disrupt the driving connections between its driving and driven elements until a predetermined speed of its driven element is attained.

Another object of the invention is to provide a shifting mechanism whose operation is responsive to the value of the torque ratio of its driving and driven elements that embodies a positive two-way drive, namely, driving and hold-back connections between the driving and driven elements.

Another object of the invention is to provide a control mechanism to cause automatically, at predetermined road speed of the vehicle, the operation of shifting mechanisms that are responsive to the value of the torque ratio of their driving and driven elements, to cause a shifting from a lower to a higher speed or from a higher to a lower one, and also means to employ this control mechanism's performance in part, in its entirety, or not at all at the will of the operator.

In this invention the auxiliary control mechanism is retained practically in the same form as disclosed in my application for patent Serial No. 420,978, filed November 29, 1941 (now Patent No. 2,341,946, granted February 14, 1944).

The driving drum in this invention has a series of notches on its inner cylindrical surface adapted to receive driving and hold-back pawls. Pawls in this invention take the place of the driving rollers. The torque balancer comprises a cylindrical member having flanges at each of its ends and so splined on a floating shaft, which is the driven element, that it is free to rotate on the shaft a predetermined amount. Shafts between flanges of the torque balancer, having their ends fastened in the flanges and not free to turn, support the pawls and the pawls are free to oscillate on them. Springs which force the pawls in driving contact with the notches in the driving drum take the place of the springs behind the rollers whose function is to force the rollers into driving contact. Superimposed between the fins on the outside of one of the flanges of the torque balancer and the projections of a torque control member tightly splined to the floating shaft, which is the driven element, are springs which perform a similar function as the spring fastened to the torque balancer and the driven element in the mechanism employing rollers to transmit the driving torque; and other functions more fully described in the following specification. The above is the analogy between the mechanism disclosed in my Patent No. 2,039,451, dated May 5, 1936, and this invention.

This invention is an improvement upon that disclosed in my Patent No. 2,039,451, in being particularly adapted to heavy duty work, such as Diesel driven trains, heavy trucks, buses and the like and to stationary engines. Its change speed mechanisms, in the main, are responsive to two values of torque ratio of their driving and driven elements and are applicable to many types of machines, having driving and driven elements other than self-propelled vehicles; and it is not the intention to limit this invention to the use of self-propelled vehicles, the description of its use in self-propelled vehicles being employed only to set forth the invention.

The invention will be more clearly understood from the following description in conjunction with the accompanying drawings, in which.

As illustrated in the accompanying drawings, the invention is embodied in a self-propelled vehicle transmission and particularly in the shifting mechanisms which operate automatically in response to the value of the ratio of the torque of the driving element to the torque of the driven element.

Briefly, the present transmission includes a main drive shaft B, a driving gear 63 keyed thereto, a floating shaft K coaxial with shaft B having mounted thereon two almost identical shifting mechanisms X and Y which include a torque balancer C responsive to the ratios of the driving and resisting torques of the driving and driven elements. The mechanism further includes a rotatable countershaft J having gears 64, 68 and 95 fixed thereon, a clutch N connecting the elements on floating shaft K to coaxial driven shaft T, a driven gear on shaft T and an over-riding clutch O connecting gear 86 to shaft T. In motor direct drive (third or high gear), the drive is straight through shaft B, K and T, shifting mechanism and drum A rotating in unison therewith. When the resisting torque is a predetermined amount greater than the driving torque, the shifting mechanism operates and torque balancer C moves to disconnect driving pawls G and to hold them out of the driving relation to drum A, thus disconnecting the torque drive, and the drive then is from gear 63 on shaft B to gear 64 or 68 on countershaft J to gear 69 keyed to drum A of the shifting mechanism Y on shaft K, and thence through clutch O to shaft T corresponding to second or intermediate gear. When the resisting torque is a predetermined amount greater than the driving torque, shifting mechanism Y operates similarly to X, and the drive is from gear 63 on shaft B to gears 64 and 95 on countershaft J to gear 86, clutch O and thence to shaft T—corresponding to first or low gears.

Figures 4, 5, 6:
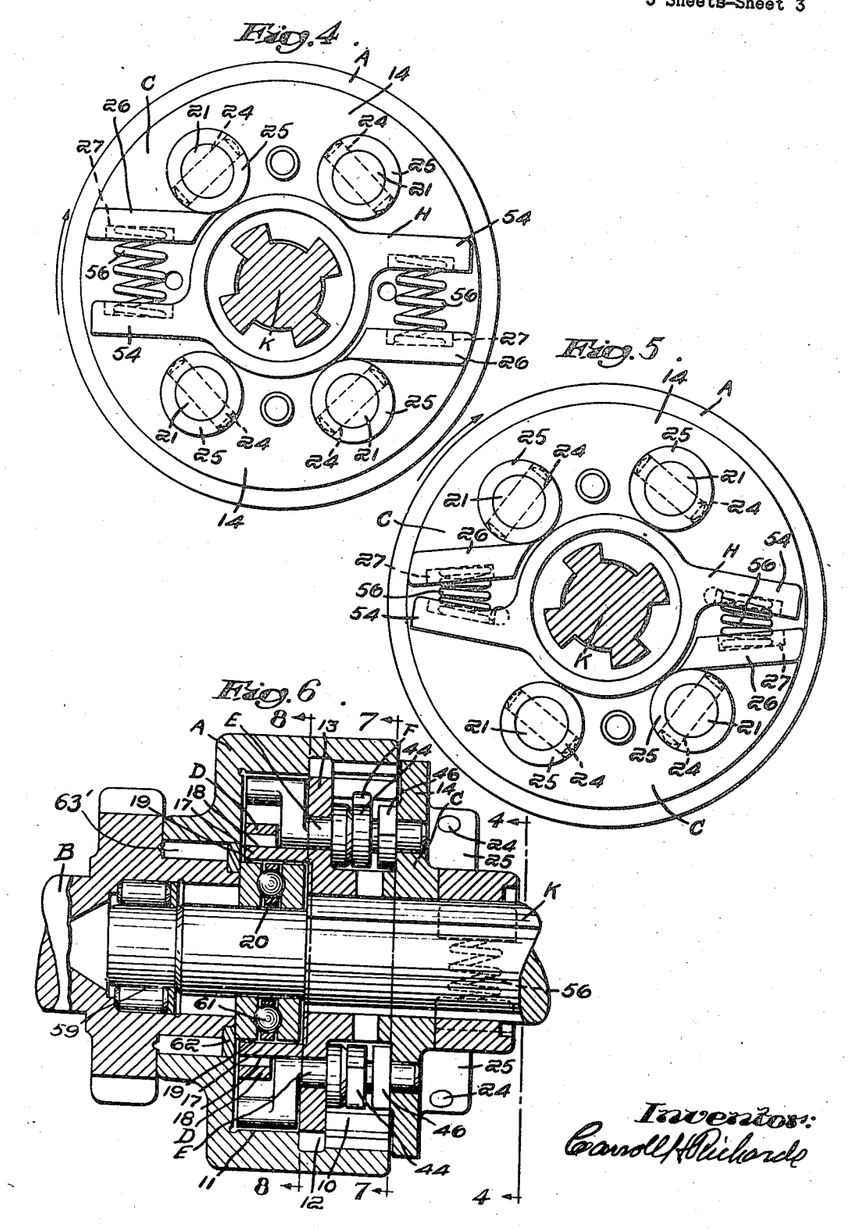
Fig. 4 is a sectional view taken on the line 4—4 of Fig. 6.
Fig. 5 is a view similar to Fig. 4 with some of the parts in different positions.
Fig. 6 is an enlarged longitudinal sectional view of a portion of the mechanism shown in Fig. 1.

The drum A of the shifting mechanism (see Figs. 4, 6, 8, and 10) is keyed to an enlarged portion of driving shaft B by keys 63' (Fig. 6).

The rear portion 10 of the inner cylindrical surface of the drum A comprises a series of rounded notches 10 and the forward portion 11 of the inner cylindrical surface of drum A is ground smooth. An annular groove 12 located between these surfaces 10 and 11 is for the purpose of facilitating machining.

The torque balancer C (Fig. 13) is made in two parts 13 and 14). Two tongues 15 of part 13 diametrically opposite each other are pressed into two notches 16 of part 14, diametrically opposite each other. Torque balancer C is loosely splined to the floating shaft K. The splines of the shaft K are suitably smaller in width than the spline ways of the hub of the torque balancer (see Figs. 8, 9 and 10). This method of splining permits the torque balancer to rotate on shaft K a predetermined amount. Projections 17 are integral with the flange of part 13 of the torque balancer C and have cylindrical surfaces 18 which are suitably eccentric with the center of rotation. The inside cylindrical surfaces 19 of projections 17 are concentric with the center of rotation and clear the thrust bearing 20, the radius of the surfaces 19 being greater than the outside radius of the thrust bearing 20 (Fig. 6).

Figure 13:
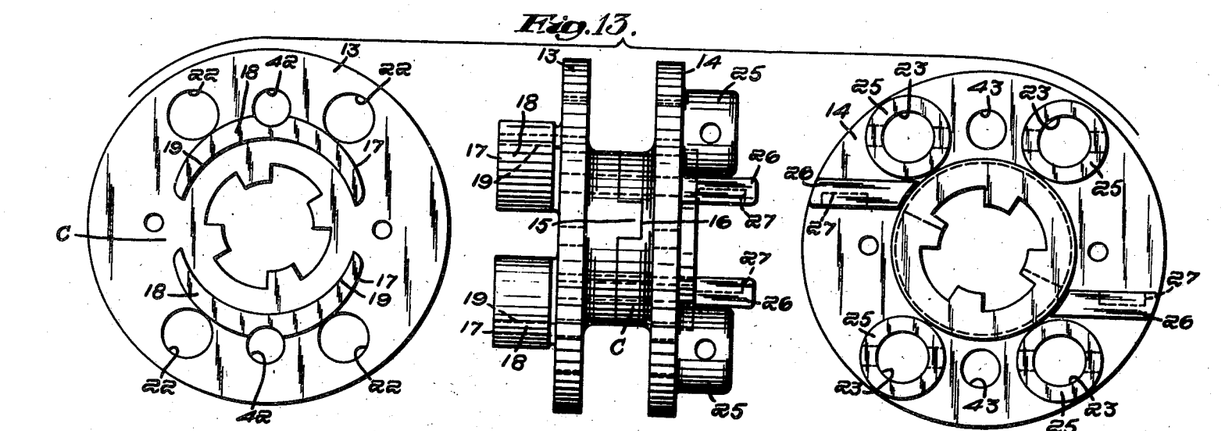
Fig. 13 is a detail view of certain parts of the portion of the mechanism shown in Fig. 6.

Shafts 21 pierce both front and rear flanges of the torque balancer C through holes 22 and 23, respectively, and are supported by the flanges. The front ends of the shafts 21 are supported in holes 22 in the front flange of the part 13 of the torque balancer and their ends are flush with the outside surface of the flange.

The rear ends of shafts 21 are supported in holes 23 in the rear flange of part 14 of torque balancer C and are held in place and prevented from turning by taper pins 24 dotted in Fig. 4. These pins 24 pierce the shafts 21 and bosses 25, the bosses 25 being integral with the rear flange of the part 14 of torque balancer C.

Fins 26 project longitudinally with shaft K from the rear flange of part 14 of the torque balancer C and are integral with the flange of part 14. Each fin has a receptacle 27 shown dotted and adaptable to receive the end of a coil spring 56 (Fig. 5).

Saddle D (Fig. 14) has a cylindrical surface 28 which has substantially the same radius as cylindrical surfaces 18 of projection 17 of the torque balancer C. The saddles D are supported by these projections 17 of the torque balancer C and their surfaces 18 and are adapted to oscillate in the direction or opposite to the direction of the drive, over surfaces 18.

Figures 8, 9, 10:
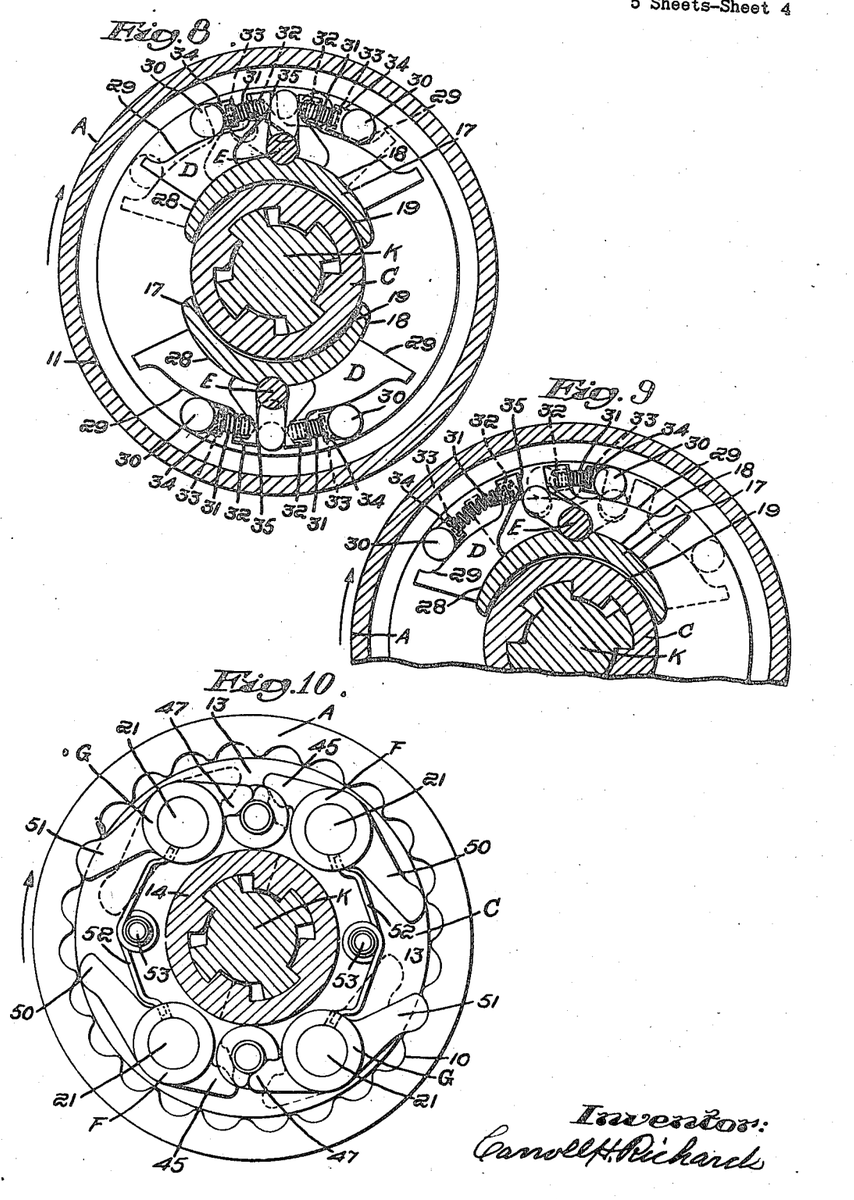
Fig. 8 is a sectional view taken on the line 8—8 of Fig. 6.
Fig. 9 is a fragmentary section view similar to Fig. 8 with some of the parts in different positions.
Fig. 10 is a sectional view taken on the line 10—10 of Fig. 1.

Surfaces 29, of the saddles D, conform to that of a roller over-riding clutch cam and rollers 30 contact with these surfaces 29 and the inner cylindrical surface 11 of the driving drum A (Fig. 8). Springs 31 seated in receptacles 32 of the saddles D and receptacles 33 of shoes 34 which contact the rollers 30 are in compression and force the rollers 30 into continuous contact with surfaces 29 of saddles D and surface 11 of the drum A when in driving position.

Figure 14:
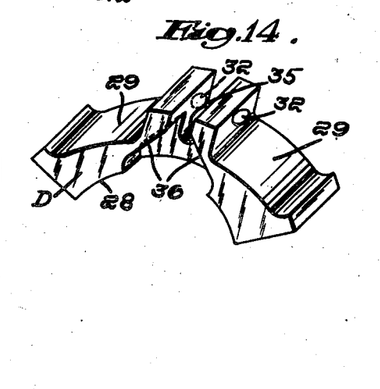
Figs. 14 and 15 are enlarged detail views of different parts of the mechanism.

Elongated grooves 35 and clearance recess 36 of the saddles D receive the crank end of cam shaft E (see Figs. 8 and 14).

Figure 16:
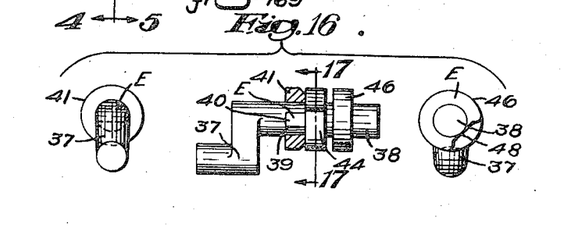
Fig. 16 is a detail of a crankshaft and its associated parts forming a portion of the mechanism of the invention including longitudinal and end elevational views.

Cam shaft E is made in two parts, crank end 37 and the cam end 38 (Figs. 6 and 16). This construction is to facilitate assembly. The crank end of shaft E has a groove 39 into which fits a tongue 40 of the cam end of shaft E. A connecting ring 41 surrounds the tongue and groove connection of the two ends. Connection ring 41 is chamfered on its side next to its cam end to afford clearance for the tail of the pawl this cam contacts. The cam shaft E is journalled in the holes 42 and 43 of the parts 13 and 14, respectively, of the torque balancer C (Fig. 13). Cams 44 contact the tails 45 of hold-back pawls F and are integral with the end 38 of cam shafts E (Fig. 10). Cams 46 contact with the tails 47 of the driving pawls G (Figs. 16 and 10). When the tails 45 and 47 of pawls F and G, respectively, are in the recesses 48 and 49 of cams 46 and 44, respectively, the contact ends 50 of pawls F are in potential or active operative connection with the notches 10 of the driving drum A and the contact ends 51 of the pawls G are in potential or actual operative connection with the notches 10 of the driving drum A (Fig. 10). But when the tails 45 and 47 of the pawls F and G, respectively, contact any other part of the surfaces of the cams 44 and 46, respectively, other than the recesses 49 and 48, the contact ends 50 of pawls F and the contact ends 51 of pawls G are not in potential or actual operative contact with notches 10 of driving drum A. The contact ends 50 and 51 of the pawls F and G, respectively, cannot be in operative contact with the notches 10 of the driving drum A at the same time, which is obvious from the drawing (see Fig. 10). Or, in other words, either the contact end 50 of pawls F are in operative connection with notches 10 of the driving drum A and the contact ends 51 of pawls G are out of operative contact with the notches 10 of driving drum A and vice versa.

Light springs 52 are coiled about rods 53 that pierce the flanges of parts 13 and 14 of torque balancer C and are held in place by shoulders near their ends which abut the inside surfaces of the flanges (Figure 10). Springs 52 having one of their ends loosely anchored in a hole in the hub of one of the pawls F and their opposite ends similarly anchored in the hub of one of the pawls G, continually tend to force the contact ends 50 and 51 of pawls F and G, respectively, into potential or actual operative engagement with the notches 10 of the driving drum A.

Figure 15:
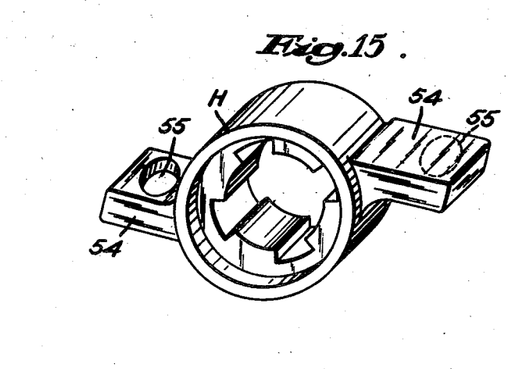

Torque control member H has projections 54 integral with the hub of member H and these projections extend outwardly from the hub and are not in the same horizontal plane (Figs. 4 and 15). Receptacles 55 in the projections 54 are adapted to receive the ends of torque balancer springs 56. Receptacles 55 in the projections 54 of torque control member H line up with receptacles 27 of fins 26 integral with the part 14 of the torque balancer C (Figs. 4 and 13). Torque control member H is tightly splined to floating shaft K and can only move with the shaft K.

Figure 7:
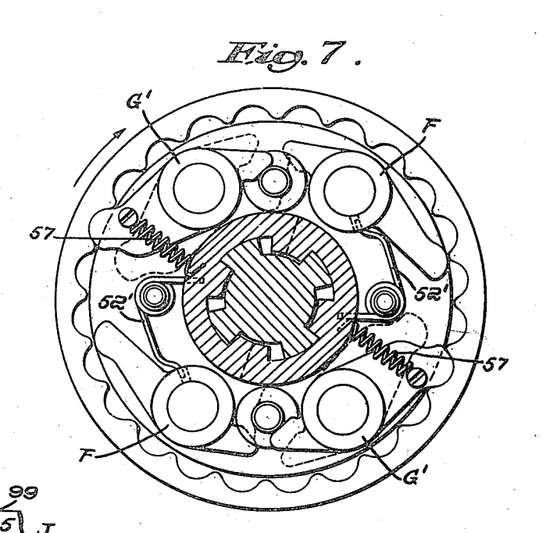
Fig. 7 is a sectional view taken on the line 7—7 of Fig. 6.

Torque balancer springs 56 are seated in receptacles 27 of the fins 26 of the torque balancer C and receptacles 55 of projections 54 of the torque control member H. These springs 56 are normally in compression and tend to force the torque balancer in the direction of the drive at all times. Except during the changing of speeds, the springs force the torque balancer in the direction of the drive to such a degree that one side of each of the spline ways of the torque balancer C is forced up against one side of each of the splines of floating shaft K and held there, as shown in Figs. 4 and 8. In other words, the torque balancer springs 56 force acts on the fins 26 of the torque balancer C in one direction and acts on the projections 54 of the torque control member H in the opposite direction and, since the torque control member H must move with the floating shaft K, one set of the sides of the splines of the shaft K and one set of the sides of the spline ways of the torque balancer C are normally forced together, as shown in Figs. 8 and 10. The foregoing is a description of a shifting mechanism that is operative for connection or disruption of the drive at any speed of the vehicle. Fig. 7 discloses a transverse section of a shifting mechanism similar to that section shown in Fig. 10. This shifting mechanism is only operative for connection and disruption of the drive after a certain speed of the driven member or floating shaft K has been attained.

This shifting mechanism disclosed in Fig. 7 is particularly adapted to heavy duty work where it is desired to assure the start of the vehicle from a standstill on the level ground in a speed lower than high or lower than any defined ratio without employing the value of torque ratio to cause the change from any higher speed to a lower speed ratio when starting the vehicle.

This mechanism differs as to that just described in that the springs 52' only act on the hold-back pawls F to force them into operative connection with the driving drum A, having no connection whatsover with the driving pawls G'. Pawls G' are made suitably heavier than pawls G in the first described mechanism in order to make them more responsive to centrifugal force. Springs 57 have one set of their ends suitably fastened to desirable points on pawls G' and the other set of their ends anchored at suitable locations in the hub of torque balancer C. These springs hold the pawls F out of operative driving connection until a predetermined speed of the floating shaft K is attained, and after this speed has been attained, due to centrifugal force they are available for operative driving connection with the driving drum A. All the other mechanism in this shifting drum A is identically the same as disclosed in the first shifting mechanism described. The hold-back pawls F could be held out of operative connection in the same manner if desirable.

Figure 11:
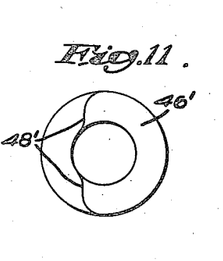
Figs. 11 and 12 are detail views of different parts of the mechanism.

Fig. 11 discloses a cam that is employed in low speed shifting mechanism only. Since this cam 46' is so designed that starting from a standstill the driving pawl G will always be in a potential or actual position for an operative driving connection with the driving drum A, the control mechanism described in the foregoing cannot move this cam 46' to such a position to control the driving pawls G that such operative connection cannot be had. The cam 46' can be controlled by the control mechanism so that both sets of driving pawls G and hold-back pawls F are held out of operative contacts with driving drum A if the driving drum A is rotating slower than floating shaft K. If the immediate foregoing condition at starting from a standstill existed, it would mean that the start was consummated through some higher speed shifting mechanism higher than that of the low speed.

Figure 12:
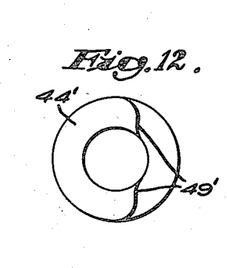

Fig. 12 discloses a cam 44' which is used in the high speed shifting mechanism only. Since this cam 44' is designed so that the set of hold-back pawls F are always in a potential or actual position for operative connection with the driving drum A, when the driving drum A and the floating shaft K are rotating at the same speed or near the same speed, the controlling mechanism described in the foregoing cannot move the cam 44' to such a position to control the hold-back pawls F so that operative connection cannot be had. The cam 44' can be controlled by the control mechanism so that both sets of driving pawls G and hold-back pawls F are held out of operative contacts with driving drum A if the driving drum A is rotating faster than floating shaft K, during which operation the drive is being consummated through some lower speed shifting mechanism.

Figure 1:
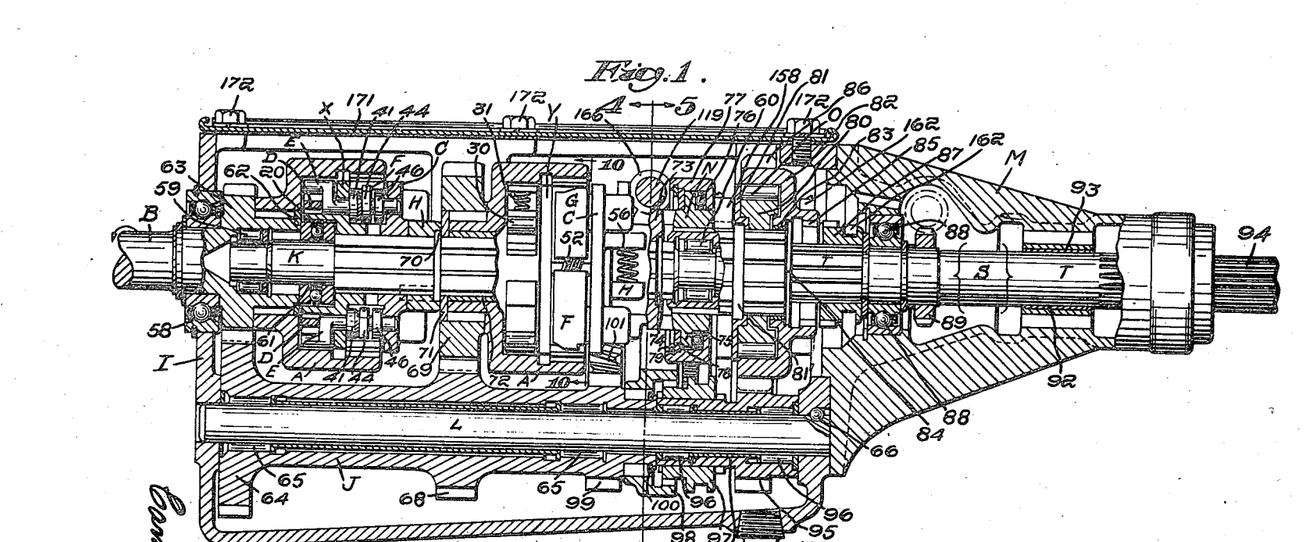
Fig. 1 is a longitudinal sectional view of a mechanism embodying the invention.
Figure 2:
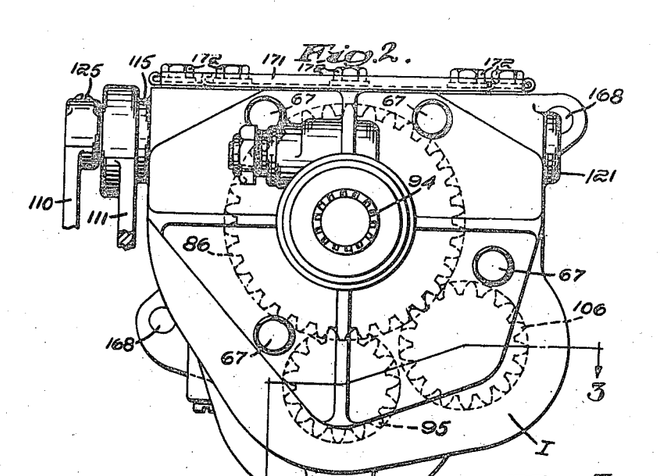
Fig. 2 is an elevational view of the mechanism as viewed from the right of Fig. 1.

Shaft B is the driving shaft connecting with the main conventional clutch not shown in the drawings, and this main clutch may be the conventional plate type clutch, the fluid clutch drive, generally known as the "fluid fly wheel" or any conventional clutch (see Fig. 1). This shaft B transmits the power to the transmission mechanism and is journalled in ball bearing 58, conventionally anchored in the case of housing I. In the enlarged end of shaft B is roller bearing 59 in which is journalled one end of floating shaft K. The opposite end of shaft K is journalled in roller bearing 60 in the enlarged end of the tail shaft T.

Keyed to the outside of enlarged end of shaft B is the driving drum A of shifting mechanism X. Shifting mechanism X is of the type disclosed in the transverse section, Fig. 7.

A thrust ball bearing 61 is pierced by floating shaft K and one side of the bearing 61 abuts the enlarged end of shaft B and a portion of the side of ring 62 which locates the driving drum A of shifting mechanism X on the enlarged end of shaft B to which driving drum A is keyed. The opposite side of thrust ball bearing 61 abuts a shoulder of the splined portion of floating shaft K.

Integral with the enlarged end of shaft B is a gear 63 which meshes with gear 64 integral with hollow countershaft J. Through these gears 63 and 64 the drive is transmitted to the hollow countershaft J.

Hollow countershaft J is free to revolve about stationary shaft L on two needle bearings 65. Shaft L is held from moving forward longitudinally and prevented from rotating by conventional ball and slot lock 66, said shaft L being supported in the front and rear ends of housing or case I. Shaft L is prevented from moving rearward longitudinally by the rear housing M which is bolted to the case or housing I by bolts 67.

Gear 68 is integral with hollow countershaft J and meshes with gear 69 keyed to the hub of driving drum A of the shifting mechanism Y. A split ring 70 of the conventional type fits into an annular recess in torque control member H of shifting mechanism X and an annular groove in the splined portion of floating shaft K and aids in locating the shifting mechanism X on floating shaft K.

A flat ring 71 sunk into an annular recess of gear 69, is loosely pierced by the splined portion of floating shaft K and abuts the split ring 70 and the end of the hub of the torque control member H of the shifting mechanism X.

The driving drum A of the shifting mechanism Y is free to rotate about bushing 72 which fits into and over the splines of the floating shaft K.

A saw tooth clutch member 73 integral with torque control member H of shifting mechanism Y is located on the floating shaft K by a split ring 74 of the conventional type which fits into an annular recess in the clutch member 73 and an annular groove in the splined portion of floating shaft K.

Flat ring 71 and this split ring 74 locate the shifting mechanism Y on the floating shaft K. Shifting mechanism Y is of the type disclosed in the transverse section, Fig. 10.

Clutch member N is movably splined on forward splined portion of tail shaft T. It has saw teeth adapted to engage the saw teeth of clutch member 73 and when these teeth are engaged, they form the driving connection between floating shaft K and the tail shaft T, and when this saw tooth clutch is transmitting the drive, due to the angle at which the teeth are cut, there is a component force continually acting to disengage the clutch members 73 and N.

An annular projection 75 which is integral with the clutch member N contacts with the thrust ball bearing 76. Inner surface of yoke 77 contacts the balls on the opposite side of thrust bearing 76. The component of force to disengage the clutch members is transmitted by the annular projection 75 to the balls of the thrust bearing 76 which in turn transmits this force to the yoke 77.

A flat ring 78 fits into an annular recess in the yoke 77 and is adapted to contact with the forward side of annular projection 75 of the clutch member N and is held in place by a conventional spring ring 79 which fits into an annular internal groove in yoke 77.

Tightly splined to the enlarged splined end of tail shaft T is the cam member 80 of over-riding clutch O. A circular plate 81 fits into an annular recess in the cam member 80 and functions as a roller retainer for one side of the clutch. A split ring 81 of the conventional type fits into an annular recess in plate 81 and into an annular groove in the splined portion of the large end of tail shaft T and locates the over-riding clutch O and prevents it from any longitudinal forward movement along the tail shaft T. The drum 82 of the over-riding clutch O when idling has the rollers of the clutch as a bearing but is further supported by rotating over bushing 83. Bushing 83 fits tightly into the splines of the enlarged end of tail shaft T and is pierced by the tail shaft T. Spring ring 84 of the conventional type fits into an annular recess in the drum 82 and in an annular groove in the smaller portion of tail shaft T and up against the shoulder of the enlarged end of the tail shaft T and locates the over-riding clutch on tail shaft T and prevents rearward longitudinal movement along the shaft T. Integral with the drum 82 is the female member 85 of a conventional tooth clutch.

On the outside of the over-riding clutch drum 82 and integral with it is a gear 86. This gear 86 functions as the low speed gear in both the automatic and conventional relations, and also functions in the reverse gear relation, all of which will be explained later. A male clutch member 87 of the conventional tooth type is slidably splined on the small splined portion of tail shaft T and is adapted to engage with the female member 85 integral with the over-riding clutch drum 82.

Tail shaft T is journalled in ball bearing 88 held in housing M in the conventional manner, and this bearing 88 can resist a thrust longitudinally in either direction along the tail shaft T.

A bushing 92 pressed into hole 93 of housing M forms another bearing for tail shaft T. Splines 94 at the extreme rear end of tail shaft T are the conventional means for connecting the tail shaft T to the propeller shaft (not shown) of the vehicle.

Gear 95 integral with a short hollow shaft J' meshes with gear 86 integral with the over-riding clutch drum 82. Short hollow shaft J' is free to rotate about shaft L on needle bearings 96, movably splined on short hollow shaft J' is male clutch member 97 of the conventional tooth type clutch adapted to engage female clutch member 98 of the conventional tooth type. Female clutch member 98 is keyed to the extreme rear end of hollow shaft J and is located on hollow shaft J by abutting the side of gear 99, which gear is integral with hollow shaft J and by conventional spring ring 100 which fits into an annular recess in female clutch member 98 and in annular groove in the hollow shaft J.

Figure 3:
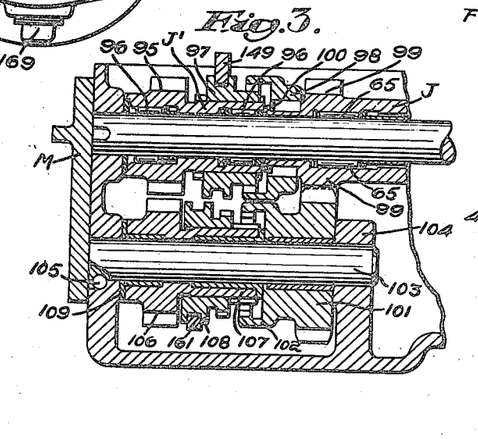
Fig. 3 is a sectional view taken on the line 3—3 of Fig. 2.

Gear 99 integral with hollow countershaft J meshes with gear 101 (see Fig. 3). Integral with gear 101 is female clutch member 102 which is of the conventional tooth type. Gear 101 and its clutch member 102 is bushed and is free to rotate on stationary shaft 103. Stationary shaft 103 is supported at its forward end by projection 104 on the inside of case or housing I and integral with the housing. The rear end of shaft 103 is supported in the rear end of housing I and is held to prevent forward longitudinal movement and rotating by the conventional ball and groove lock 105, and is held to prevent rearward longitudinal movement by abutting housing M.

Gear 106 is integral with sleeve 107 and meshes with gear 86. Sleeve 107 is bushed and is free to rotate about stationary shaft 103 and is splined at its forward end. A male clutch member 108 of the conventional tooth type is splined on sleeve 107 and is slidable thereon. A plate thrust bearing 109 is anchored to housing I in any of the many conventional ways. The rearward end of sleeve 107 contacts plate thrust bearing 109. Clutch members 108 and 102 may be manually engaged or disengaged for aiding in connecting or disrupting the reverse drive, since the reverse gear train includes gears 99, 101, 106 and 86.

All drawings show the transmission in operating relation for the forward driving of the vehicle through the automatic mechanism controlled by the driver's change of the value of torque ratio which will be more fully explained later. This means that the clutch members N and 73 and clutch members 97 and 98 are in driving engagement and that all other clutch members are out of driving engagement.

Suitable mechanism may be provided to cause the transmission to operate for driving the vehicle forward or in reverse direction or for placing the transmission in neutral.

To drive the vehicle in reverse, clutch members 85 and 87 and 108 and 102 must be in driving engagement and all other clutch members must be out of driving engagement.

The transmission of the drive in reverse is as follows: Gear 63 integral with drive shaft B meshes with gear 64 integral with hollow countershaft J and the driving torque is transmitted through gears 63 and 64 and hollow shaft J to gear 99 integral with hollow shaft J. Gear 99 meshes with gear 101 (see Fig. 3) and drives gear 101, which in turn drives gear 106 through the clutch members 102 and 103, which are in driving engagement. Gear 106 meshes with gear 86 integral with drum 82 of the over-riding clutch O and drives the gear 86. Gear 86 drives the tail shaft T through the clutch members 85 and 87 which are in driving connection.

The operation of this invention will be made clear from the following description.

To define the value of the torque ratios to which the mechanism is responsive, it is treated in a mathematical manner. If the ratio is written the driving torque is to the resisting torque, e. g.

$$\frac{\text{Driving torque}}{\text{Resisting torque}}$$

there are two general values of torque ratio to which the mechanism is responsive and these two will be paramount in the following description of the operation. When the driving connection exists and the motor is actually driving the vehicle, writing DT the value of the driven torque, and RT the value of the resisting torque, both DT and RT are known to be finite values, and $$\frac{DT}{RT}=$$

a finite value at any instant during this performance.

If the resisting torque becomes zero, such as near the time of the beginning of the reversal of the torque, during the reversal of torque or when a disruption of drive is had between the motor and the transmission, when the motor is operating $$\frac{DT}{RT} = \frac{\text{a finite value}}{0}$$

and the value of the torque ratio is infinity. The conception of "reverse torque," as applied to self-propelled vehicles herein, is the dissipation of kinetic energy of the vehicle operative through the driven member to drive or tend to drive the motor or the vehicle in the direction of the drive. And when a reverse torque exists, the value of the resisting torque is zero.

Heretofore all transmissions to obtain a smooth drive did it at the expense of dissipating the kinetic energy of the vehicle. This transmission will only dissipate this kinetic energy a negligible amount to secure a smooth drive whether operating through the predetermined speed change mechanism or the operator-controlled mechanism and the vehicle may be driven by a poor driver.

The hypothesis is that the two values of torque ratio to which this mechanism is responsive to change speeds from a higher to a lower speed or from a lower to a higher one are a finite value and an infinite value.

When the value of the torque ratio as considered herein between the driving and driven element is finite, a driving connection exists. When the value of the torque ratio of the driving and driven element is infinity, a disruption of the driving connection exists.

If a torque causing a change of value of torque ratio from a finite value to an infinite value is of substantial predetermined characteristics and duration relative to the speeds of the driving and driven elements, the driving connection in the shifting mechanism then transmitting the drive is disrupted and a driving connection through another shifting mechanism may be negotiated.

To change speeds or the transmission of the driving torque through one gear ratio to another requires two changes of torque ratio values, e. g., from the finite value to the infinite value and from the infinite value to the finite value.

When the infinite value of the torque ratio exists, the motor can only dissipate its driving torque in increased motor speed limited by the value of the open throttle.

A practical idea of the duration required for the shifting of speeds is well depicted during the natural "reverse torque" shift, which occurs at or near the stalling point of the motor. The shifting mechanisms will not permit the motor to stall, and the jerky performance experienced in a vehicle embodying the conventional type of transmission when this natural "reverse torque" occurs is not experienced with this transmission as a shift to a lower speed is negotiated automatically. The foregoing and that which immediately follows is the description of the performance of one shifting mechanism only.

In Figs. 4 and 5, springs 56 are the torque balancer springs and their function is to aid making and maintaining driving connection within predetermined limits and they do not function outside these limits. Therefore the continuance of the driving connection and its disruption occurs outside the above-mentioned limits.

It is a well-known fact in the performance of a self-propelled vehicle that the torque ratio value is constantly changing from a finite to an infinite value and from an infinite to a finite value. The frequency of these cycles depends on the characteristics of the propelling power, of the vehicle itself, the terrain encountered by the vehicle, etc. These torque balancer springs 56 smooth out these cycles by maintaining a finite torque ratio value within their control and by permitting an infinite torque value to exist, when this torque value will not be detrimental to the smoothness of the drive.

When the drive is transmitted through any shifting mechanism, it is transmitted to the splines of floating shaft K through the sides of the spline ways of torque balancer C.

Torque balancer springs 56 are normally under compression (see Fig. 4) and normally keep the splines of shaft K and the spline ways of torque balancer C in contact with each other, as shown in Figs. 8 and 10, which is not required of them if the driving torque is actually driving shaft K by being transmitted through the driving drum A, driving pawls G, to torque balancer C and through its spline ways to the splines of shaft K. During this described transmission of the driving torque, the torque balancer springs 56 are inactive and the value of the torque ratio is definitely finite.

At the point during one of the cycles of the propelling of the vehicle just described, where the resisting torque becomes zero and the value of the torque ratio is infinity, the springs 56 begin to function.

When the infinite value of the torque ratio exists and the resultant characteristics and duration of the torque causing it are within the limits of the control of the torque balancer's springs 56, shaft K is rotating faster at that instant than the driving drum A.

The control mechanism, because of this difference in speed between the driving drum A and shaft K, through the driving contact of the rollers 30 with driving drum A and saddles D, moves saddles D relative to torque balancer C in an opposite direction to the drive toward their dotted positions in Fig. 8 and full line positions in Fig. 9. This movement of the saddles D moves crank shaft E in a counter-clockwise direction, and due to the eccentricity of the cylindrical surfaces 18 of the projections 17 of the torque balancer C, over which the saddles move, the torque balancer C has moved in the direction of the drive but not as fast as shaft K and the spline ways of torque balancer C are not in contact with the splines of shaft K.

The movement of crank shaft E rotates cams 44 and 46, which are integral with a portion of crank shaft E, in a counter-clockwise direction. Cams 46 and 44 contact with the tails 47 and 45 of driving pawls G and hold-back pawls F, respectively.

After sufficient movement of the saddles D, which movement is transmitted to the crank of crank shaft E through crank shaft E to cams 46 and 44, cams 46 contact with the tails 47 of the driving pawls G and rotate the driving pawls G out of their potential driving contact positions with driving drum A. Since the value of the torque ratio was infinite before the pawls G started to move, their movement was not under load, except for the small force exerted on them by springs 52.

During this movement of pawls G, cams 44 contacting with tails 45 of hold-back pawls F have rotated pawls F until the tails 45 of the pawls have registered with and fitted into the recesses 49 of the cams 44.

Since the shifting mechanism is so designed that when the tails 45 of pawls F registered with and fitted into recesses 49 of the cams 44 the travel of the drum A was so timed that pawls contacting ends 50 registered loosely in a notch in the drum A, forced into position by springs 52 and then seated by torque balancer springs 56, which could act to this extent since the spline ways of the torque balancer C were not in contact with the splines of shaft K, as just immediately described in this description. The saddles D and their rollers 30 did not reach their dotted positions, Fig. 8, or their full line positions, Fig. 9, but moved toward these positions away from their normal positions a sufficient distance to facilitate the driving contact of pawls F and the driving drum A.

Shaft K now continues to rotate faster than the driving drum A and closes the space between its splines and the spline ways of the torque balancer C. But during this motion to close the space between the splines and spline ways, torque balancer springs 56 are compressed beyond their normal compression to the maximum compression to which they are ever submitted (see Fig. 5). As long as the space is closed between the splines of shaft K and the spline ways of torque balancer C, as shown in Fig. 9, shaft K will be transmitting the "reverse torque" directly to the torque balancer C which in turn through hold-back pawls F will transmit this torque to the driving drum A. If under these driving conditions the splines of shaft K and spline ways of torque balancer C break contact and this contact is not renewed, springs 56 will exert a pressure on the hold-back pawls F to maintain their driving contacts with driving drum A until the opposite sides of the spline ways of torque balancer C and splines of shaft K contact (as shown in Figs. 8 and 10), at which time the springs 56 will be inactive.

A change in the value of the ratio of the torques, when the above-described conditions exist, would be a change from an infinite value to a finite value. Assuming that the torque that would cause such a change and its duration are within the control of torque balancer springs 56, the operation of the shifting mechanism would be as follows. Driving shaft B and driving drum A would increase in speed until for an instant or longer duration drum A would rotate at the same speeds as shaft K and then driving drum A would start to rotate faster than shaft K and, at this point in the operation, the control mechanism, whose saddles D and rollers 30 in the operation described in which they had taken an intermediate position between their dotted positions in Fig. 8 and full line positions in Fig. 9 and their normal positions in full lines in Fig. 8, will now be moved to their normal positions due to the driving contact of the rollers 30 with the saddles D and the driving drum A. But during this operation the torque balancer springs 56 have been compressed beyond their normal compression. This compression of springs 56 is due to the eccentricity of surfaces 18 of the torque balancer projections 17, over which the saddles D slide, and this movement of the saddles D increases the distance between the spline ways of the torque balancer C and the splines of shaft K, all of which is more fully explained in that which follows.

During the movement of the saddles to their normal positions, their movement was transmitted to the cranks of crank shafts E and turned the crank shafts E to their normal positions, which in turn rotated the cams 44 and 46 to their normal positions and, due to their contacts with the tails 45 and 47 of the pawls F and G, respectively, have rotated hold-back pawls F, not under load, out of driving contact with driving drum A, and driving pawls G into potential driving contact positions with driving drum A. Since driving drum A was moving away from the contact ends 50 of pawls F, they were out of contact when their above described movement started, and the only force resisting their movement was that force exerted on them by springs 52.

Ordinarily at this point of the operation pawls G would not be in potential driving contact positions but would be in actual driving contact with drum A. The disruption and connection of the drive that has just been described set forth the operation of a shifting mechanism during the changing of the value of torque ratios during the normal performance of the vehicle and would be what was previously described as smoothing out the drive. Under such conditions of the vehicle performance the driving pawls G and hold-back pawls F would be so timed as to their connections and disruption with the driving drum A and its travel that practically when one of them was disconnected the other would be connected in driving contact with the drum A. This was fully explained in the description of the disruption of the driving pawls G and the driving connection of hold-back pawls F in the foregoing.

The foregoing description of the operation of a shifting mechanism was relative to the driving of the vehicle when there were changes in the value of torque ratio but no changing of speeds or, in other words, there was no change of the drive from one shifting mechanism to another.

The following is a description of the operation of the shifting when a reverse torque of such a character and duration that the hold-back pawls F will not make a driving contact with driving drum A or the operation of the shifting is not within the control of the torque balancer springs 56.

In the transmission shown in the drawings, such a performance could only be had in the intermediate shifting mechanism Y (see Fig. 3). However, this performance could be had in any shifting mechanism usually employed in intermediate speeds but it is not necessary to use it in all intermediate gear ratios.

This reverse torque just mentioned would be caused to exist by reasonably suddenly closing the throttle, such as removing the foot reasonably suddenly from the accelerator when the vehicle is in low speed.

When this transmission is operating in low speed, shifting mechanism Y is operating as follows. The driving drum A is rotating faster than the torque balancer C and shaft K. The saddles D and rollers 30 of the control mechanism are in their extreme positions in the direction of the drive, as shown dotted in Fig. 9, and the rollers 30 are idling as they have reached the position where they have no driving contact with the saddles D and the driving drum A. Since the saddles D are in their extreme positions in the direction of the drive (see Fig. 9), the cams have been rotated until the tails 45 and 47 of the pawls F and G, respectively, are contacting the cams 44 and 46, respectively, on their outermost surfaces about fifty degrees in a counterclockwise direction from their normal positions, as shown in Fig. 10. Tails 45 of pawls F are contacting the cams 44 at a position about fifty degrees in a counter-clockwise direction from its normal position of contact as shown in Fig. 10. Tails 47 of pawls G are contacting the surfaces of cams 46 at a position of about fifty degrees in a counter-clockwise direction from its normal position of contact shown in Fig. 10. With the tails of the pawls F and G contacting their cams on the parts of their cam surfaces just described, it is obvious that neither set of pawls F or G are in potential driving contact position with driving drum A. The spline ways of torque balancer C and the splines of shaft K are in contact with each other, as shown in Fig. 8, and the torque balancer springs 50 are inactive.

Since the throttle is closed, the motor decreases in speed and, due to the momentum of the vehicle shaft K, is rotating at a speed depending on the speed of the vehicle at the time of closing the throttle and the terrain the vehicle is encountering.

The shaft K and torque balancer C sometime during this performance rotates for an instant or a longer duration at the same speed as drum A of the shifting mechanism Y. During this performance the torque balancer C and shaft K are rotating together, held in contact with one another by torque balancer spring 56.

As was set forth in the beginning of the immediate description, the "reverse torque," now being considered, is produced by the kinetic energy of the vehicle and is of such characteristics and duration that when the speed of the shaft K begins to exceed that of the driving drum A and of shifting mechanism Y, the hold-back pawls F of the shifting mechanism Y will not have driving contacts with its drum A.

speed of drum A and begins to rotate faster than drum A, the saddles D and the rollers 30 of the control mechanism, which are in their extreme positions in the direction of the drive shown dotted in Fig. 9, as has been stated before, begin to move toward their normal positions, as shown in Fig. 8. The shaft K and torque balancer C continue to rotate faster than drum A in the direction of the drive and the spline ways of torque balancer C and splines of shaft K break their contact, as shown in Figs. 8 and 10.

The torque balancer springs 56 tended to rotate the torque balancer C in the direction of the drive relative to shaft K as soon as the spline ways of torque balancer C broke contact with the splines of shaft K.

When the driving drum A through the rollers' 30 driving contact with saddle D of the control mechanism drives the saddles D from their normal positions to their extreme positions, as shown dotted in Fig. 9, it is obvious that the drum must travel farther than a saddle does relative to the torque balancer C as the rollers 30 are rolling part of the drum's travel and during the rolling of the rollers 30 the drum does not drive the saddle. In the present design the drum travels substantially twice as far as a saddle relative to the torque balancer from the saddle's normal position to its extreme positions in the direction of the drive seen dotted in Fig. 9.

At the condition reached in the present described operation, the shaft K is driving the torque balancer through the torque balancer springs 56, see Fig. 4, and the saddles D and the rollers 30 are moving toward their normal positions from their extreme positions in the direction of the drive, shown dotted in Fig. 9, since shaft K is rotating faster than driving drum A. From the start of the saddles D and rollers 30 of the control mechanism movement toward their normal positions relative to the torque balancer C and until the completion of their movement into their normal positions, torque balancer C travels substantially one half of the travel of shaft K and torque balancer springs 56 are compressed beyond their normal compression to substantially the maximum compression that they are ever submitted during any operation of the shifting mechanism (see Fig. 5). These springs 56 are so compressed because the rollers 30 contacting the drum A and saddles D roll during just about one half of the rotating angular travel of shaft K, and, due to the eccentricity of surfaces 18 of projection 17 of the torque balancer C over which the saddles D slide, the rollers 30 will only permit the torque balancer C to travel substantially one half the angular distance of rotation of that of shaft K.

When the saddles D and rollers 30 of the control mechanism reach their normal positions, spline ways of torque balancer C and splines of shaft K are in their relative positions, as shown in Fig. 9. Pawls G are in their potential driving contact positions and pawls F are in the positions where a slight movement of their cams 44 in a counter-clockwise direction would permit pawls F to be forced by springs 52 into potential driving contact position, as shown in Fig. 10.

The angle of rotation that the spline ways of torque balancer C and splines of shaft K are apart during the normal position of the control mechanism parts is equal to the angle subtended by the chordal distance between the spline ways and the splines, and this angle is substantially equal to the angle subtended by the chordal distance between the center lines of two adjacent teeth of driving drum A.

The shaft K is continuing to rotate faster than driving drum A, and the saddles D and rollers 30 through the driving contact of the rollers 30 with saddles D and drum A start to move out of their normal positions (see Fig. 8) relative to torque balancer C opposite to the direction of the drive. After this movement of the saddles D has proceeded a suitable distance, torque balancer springs 56 have their maximum mechanical advantage to move the torque balancer C in the direction of the drive relative to shaft K which is rotating in the direction of the drive. Since at this point in the operation being described the torque balancer springs 56 are also at their maximum compression (see Fig. 5), and are capable of exerting their maximum force to drive the torque balancer C in the direction of the drive, they drive the torque balancer until the spaces between the spline ways of the torque balancer and splines of shaft K are closed and the spline ways and splines are in contact, as shown in Figs. 8 and 10, the movement is instantaneous, and torque balancer springs 56 are now inactive.

The instantaneous movement of the torque balancer just described was the equivalent of the moving of the saddles D and the rollers 30 to their extreme positions in the opposite direction of the drive, and these positions are shown dotted in Fig. 8 and in full lines in Fig. 9.

During this relative movement of torque balancer C and saddles D, crank shafts E and cams 44 and 46 were rotated instantaneously in a counter-clockwise direction relative to their positions, as shown in Fig. 10. This rotation of the cams 46 rotated the driving pawls G out of their potential driving positions and the tails 47 of pawls G ride on the extreme outside surfaces of their cams 46.

Cams 44, contacting the tails 45 of hold-back pawls F, have instantaneously rotated pawls F from practically their positions shown in Fig. 10 through an instantaneous potential driving contact position to a position about fifty degrees clockwise on the cams 44 from their positions shown in Fig. 10 and the tails 45 of pawls F rest on the extreme outside surfaces of cams 44 and are held out of potential driving contact positions with driving drum A.

The saddles D and rollers 30 are now in their extreme dotted positions as shown in Fig. 8 and in full lines in Fig. 9, and the rollers 30 are idling, having no driving contact with saddles D and driving drum A in this position. The shaft K and torque balancer C rotate together faster than drum A, torque balancer springs 56 are inactive, and pawls F and G are out of driving and potential driving contact with driving drum A.

It is obvious that the kinetic energy of the vehicle was only dissipated a negligible amount in operating the shifting mechanism Y of the transmission, the drive was smooth and practically all the kinetic energy dissipated was to drive the vehicle.

It is practically impossible to get the hold-back pawls F in driving contact unless the driving contact is had first by driving pawls G. However, it is possible to get the hold-back pawls F in driving contact with driving drum A without first having pawls G in driving contact with drum A if the driving drum A, the torque balancer C and shaft K rotate in practically exact synchronism for a reasonably long comparable duration.

Assuming in this operation that the speed of shaft K and torque balancer C never rotated as fast as driving drum A of shifting mechanism X (see Fig. 3), then if the throttle which has been closed is reasonably gradually opened, the speed of the motor is increased and driving drum A of shifting mechanism Y rotates as fast as shaft K and torque balancer C of shifting mechanism Y. At this instant saddles D and rollers 30 of the control mechanism of the shifting mechanism Y are in their dotted positions shown in Fig. 8 and shown in full lines in Fig. 9, and the spline ways of torque balancer C and splines of shaft K are in contact with each other as shown in Figs. 8 and 10. The torque balancer springs 56 are inactive.

As the throttle is gradually further opened, the motor continues to increase its speed and driving drum A begins to rotate faster than torque balancer C and shaft K of shifting mechanism Y.

Due to the driving drum A rotating faster than torque balancer C and shaft K, the saddles D and rollers 30 are driven by the drum A to their neutral positions, as shown in Fig. 8. The torque balancer springs 56 are compressed (see Fig. 5), and the spline ways of torque balancer C and the splines of shaft K have broken contact and are in their relative positions as shown in Fig. 9. The breaking of the contact of the spline ways and splines and the compression of springs 56 beyond their normal compression (see Fig. 5) is on account of the roll of the rollers 30 during part of the travel of drum A which was fully explained before.

At this instant of the operation, driving pawls G are in potential driving contact position with drum A and torque balancer springs 56 are compressed beyond their normal compression (see Fig. 5) and have their maximum mechanical advantage to rotate the torque balancer in the direction of the drive relative to shaft K.

The driving pawls G are in potential driving contact positions and must be less than the distance between the center lines of two adjacent teeth of driving drum A away from actual driving contact or in actual driving contact with drum A.

Assuming that the driving pawls F are not in actual driving contact with the driving drum A but are within the limit stated above. The driving drum A is rotating sufficiently near the same rotating speed of torque balancer C, since the throttle is being opened gradually, that as the drum A tries to drive the saddles D over the eccentric surfaces 18 of projection 17 of the torque balancer C or tries to drive the torque balancer C to close the distance between the splines of torque balancer C and shaft K (as shown in Fig. 9) to weaken the force of springs 56, torque balancer springs 56, now at the point in the operation where they have practically their maximum mechanical advantage to rotate torque balancer C in the direction of the drive and are compressed beyond their normal compression, and any further travel of the saddles D relative to torque balancer C causes the springs 56 to be compressed still further, springs 56 drive the torque balancer C in the direction of the drive when the saddles D are driven out of their neutral positions, as shown in Fig. 8, by drum A through the driving contact of the rollers 30 with driving drum A and saddles D. This rotation of the torque balancer C is the equivalent to bringing the saddles D back to their normal positions relative to the torque balancer C. Since drum A must travel substantially twice as far, in this design, as the saddles D during the driving of saddles D by the drum, due to the rolling of the rollers 30 which has been fully explained in the foregoing, therefore at the end of every cycle just explained driving pawls G are substantially one half of the travel of drum A nearer actual driving contacts with drum A than they were at the beginning of the cycle. It is obvious that if the driving drum A and the torque balancer C rotate within some proximity of the same speed, depending on the strength of springs 56, after a certain number of the cycles just described the pawls G will make a driving contact with driving drum A and the transmission will operate in the second speed gear ratio. The number of cycles performed necessary to negotiate the driving contact will depend on the distance the driving pawls are away from an actual driving contact with drum A when they first take their potential driving contact positions.

The vehicle is now being driven in second speed and if the driver desires to have the vehicle driven in high speed, he repeats the manual operation of the throttle employed in shifting from low to second speed, namely, closing the throttle and reasonably gradually opening it again.

The high speed shifting mechanism X is different from the intermediate shifting mechanism Y in that the hold-back cams 44' are different and the driving pawls G are held out of available potential driving contact by springs 57 and the vehicle must be travelling at a certain predetermined road speed before the driving torque can be transmitted through the shifting mechanism X.

The cams 44' are designed as shown in Fig. 12. The cams 44' are so designed that any "reverse torque" causing torque balancer C and shaft K of shifting mechanism X to tend to drive the driving drum A faster than it is rotating at the time, to be transmitted through the pawls F to driving drum A. These cams 44' accomplish this since they are so formed that once the hold-back pawls F are in potential driving contact position, they remain in this position and no operation of the control mechanism can operate to disturb their potential driving connection until the driving drum A is rotating faster than the torque balancer C and shaft K.

To shift from any lower speed to the next higher one, the throttle is closed and reasonably gradually opened again. But to shift from low to high and not stop in the intermediate speed, it is necessary that the vehicle is travelling at a speed sufficiently high and the dwell of the closed throttle be longer, and a shift from low, through second to high, will be had.

If this shift was untimely when a driving connection was established in the high speed shifting mechanism and the motor could not easily negotiate the load, a natural "reverse torque" would occur, since the performance of the motor would be near or at its stalling point and a shift to a lower speed automatically would be had.

To shift from a higher to a lower speed, by operating the throttle, the manipulation is as follows: the throttle is closed to create a "reverse torque" changing the torque ratio value from a finite value to an infinite value, then the throttle is quickly opened. The shifting mechanism from which the shift is to be made at the instant just before the quick opening of the throttle will have its controlling mechanism parts as follows: the saddles D and rollers 30 will be in their dotted positions relative to the torque balancer C as shown in Fig. 8 and in full lines in Fig. 9. The spline ways of the torque balancer and the splines of shaft K will be apart as in Fig. 9, torque balancer springs 56 will be fully compressed (see Fig. 5), and driving pawls G and hold-back pawls F will be fully out of driving contact with driving drum A. Or this shifting mechanism will have its hold-back pawls F in driving contact with drum A, the spline ways of torque balancer and splines of shaft K may or may not be together, torque balancer springs 56 may be inactive or in more than normal compression, and the value of the torque ratio in either case will be infinite.

For every set of torque balancer springs 56 of different characteristics, namely, the force they are capable of exerting and their activity, there is a limit of the difference in speed at which the torque balancer C and shaft K can rotate comparable to the driving drum A, and driving connections can be negotiated and outside of this limit of the differences of speeds of rotation of the driving drum A and the torque balancer C a driving connection cannot be negotiated. It is obvious from the foregoing that to negotiate a driving connection between the driving drum A and torque balancer C the torque balancer springs 56 must be capable of driving the torque balancer C, at the time the saddles D and rollers 30 are in their normal positions relative to the torque balancer C, as fast or faster than the drum A is driving the saddles D through the driving contact of the rollers 30 with the saddles D and drum A, and also, if required, must be able to maintain the torque balancer speed stated above for an angle of revolution equal to the angle which would be subtended by the chordal distance between a side of a spline way of the torque balancer C and an adjacent side of a spline of the shaft K. The space between the spline ways and splines would be commensurate with the spaces shown in Figs. 8 or 9. The springs 56 must be capable of driving the torque balancer C in this design under the conditions stated in the foregoing at substantially one half the angular velocity of that of the driving drum A, if a driving connection is negotiated. If springs 56 cannot drive the torque balancer C one half as fast or faster than driving drum A under the condition stated, driving connections cannot be negotiated. When the throttle is opened quickly during this operation of shifting from a higher to a lower speed, the motor increases its speed and through the intervening conventional connections increases the speed of driving drum A to such a difference in rotating speeds between it and the torque balancer C that the torque balancer springs 56 are not capable of driving the torque balancer at substantially one half the speed of the drum A and a shift to a lower speed is negotiated. Drum A, through rollers 30 and saddles D, drives the torque balancer C faster or as fast as springs 56 can drive the torque balancer and spline ways and splines contact as shown in Fig. 8 and rollers 30 and saddles D take up positions as shown dotted in Fig. 9.

The driving drum of the next lower speed shifting mechanism, due to the gear ratio through which it is driven, will be at such a relative speed to that of the torque balancer C of the shifting mechanism that springs 56 can drive the torque balancer C at an angular velocity of at least half of the angular velocity of that of the drum A and a driving connection will be negotiated in the next lower speed.

But if the speed of the drum in this next lower speed shifting mechanism should be at a speed too high comparable to the speed of the torque balancer C, a driving connection would not be negotiated and the drive would be through some lower speed shifting mechanism other than the said next lower speed mechanism. But the latter would happen very infrequently and probably never.

To start the vehicle from a standstill on level ground, the main conventional clutch is disengaged and the lever under the steering wheel is manually operated to the forward automatic speed position, which would cause the engagement of clutch members N and 73 and 97 and 98. The motor is started and permitted to reach a speed usually employed to start the vehicle if equipped with the conventional type of transmission and the main conventional clutch then engaged.

Since the drive in this transmission cannot be transmitted through the high speed shifting mechanism until a predetermined speed of the vehicle has been attained, the motor will first attempt to start the vehicle in the second speed. If the motor cannot reasonably easily start the vehicle, a "reverse torque" will naturally occur and a shift from second speed to the low speed will be negotiated and the vehicle will be started in low speed.

From the foregoing it is obvious why a reverse torque occurring naturally causes a shifting from a higher speed to a lower one. When the "reverse torque" occurs, the value of the torque ratio becomes infinite and the motor can immediately increase in speed and, at this stage of a vehicle performance, drive the driving drum A of the shifting mechanism in which the drive is attempted or has been operating to rotate sufficiently faster than the torque balancer C can be rotated by springs 56, such that the shifting mechanism cannot negotiate a driving connection and a shift to a lower speed will be had.

If by a very remote chance, when a shift from a higher to a lower speed is being negotiated and the drum A is rotating too fast for the establishing of a driving connection, the driving pawls G should move into potential driving contact which would also be exact driving contact at that time, the driving drum A would attempt to drive the vehicle at a comparable speed to the drum's speed which could not be done instantaneously, and a "reverse torque" would occur naturally and a shift to a lower speed would be negotiated as was intended.

The drive in the low speed is transmitted to gear 63 by driving shaft B with which it is integral. Gear 63 meshes with gear 64 which is integral with hollow shaft J. Hollow shaft J transmits the drive to clutch member 98 keyed to hollow shaft J. Clutch member 98 transmits the drive to clutch member 97 slidably splined to hollow sleeve J' which is integral with gear 95 meshing with gear 86 integral with the drum 82 of over-riding clutch O, and the drive is transmitted through gear 95 to gear 86, then to drum 82 of the over-riding clutch O, and over-riding clutch O transmits the drive to tail shaft T.

If the motor can start the vehicle smoothly through second speed shifting mechanism Y, the drive is transmitted from shaft B to gear 63 which is integral with shaft B. Gear 63 meshes with gear 64 which is integral with hollow shaft J and transmits the drive through gear 64 to hollow shaft J. Gear 68 is integral with hollow shaft J and meshes with gear 69 keyed to the hub of driving drum A of shifting mechanism Y and transmits the drive to drum A. Driving drum A transmits the drive through driving pawls G of shifting mechanism Y to torque balancer C, which in turn transmits the drive through its spline ways to the splines of shaft K.

To start from a standstill on a hill, the motor running and the main conventional clutch disengaged, a no-back relation exists through gear train consisting of gears 64, 63, 95 and 86 and clutch members N and 73 and 97 and 98. When the no-back relation exists, the vehicle is in low speed, since it is obvious from the foregoing that driving pawls G of shifting mechanism X are not in contact, but that the hold-back pawls F are in driving contact. Then to start on a hill, the start will always be in low speed.

Figure 17:
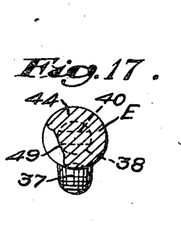
Fig. 17 is a section view taken on the line 17—17 of Fig. 16.

Fig. 17 disclosed a modified cam 46' that controls the driving pawls G in a shifting mechanism to be employed in the low speed of any transmission of this type. This cam 46' insures that the driving pawls G will always have driving contacts in the low speed when the vehicle starts to roll backward downhill with the main conventional clutch disengaged which insures the no-back relation to exist.

It also insures that the pawls G will have driving contacts in low speed, if all the shifting mechanisms of the speeds higher than low are of the design disclosed in Fig. 13, in which the driving pawls G are not operative until predetermined road speeds of the vehicle are attained. A design such as just described would be desirable in some very heavy duty vehicles.

Having thus described the invention, what is claimed as new and desired to be secured by Letters Patent is:

1. In a device having driving and driven elements, means for affecting a driving connection between said elements including a movable member and connections adapted to transmit to said member forces representative of the torques of said driving and driven elements, and mechanism responsive to relative movement of said driving and driven elements for controlling said means, the improvement in which said movable member is loosely splined on said driven element for limited rotational movement relative thereto and in which said connections include a spring operatively associated with said driven element and said movable member and adapted to effect a driving connection therebetween.

2. In a device having driving and driven elements, means for effecting connection between said elements including a movable member and connections adapted to transmit to said member forces representative of the torques of said driving and driven elements, and mechanism responsive to relative movement of said driving and driven elements for controlling said means, the improvement in which said driving element is provided with a drum having a plurality of notches and said connections include a pawl pivotally carried by said movable member and a spring operatively associated with said driven element and said movable member adapted to effect a driving connection therebetween and means for moving the pawl in engagement with one of said notches, said movable member being loosely splined on said driven element for limited rotational movement relative thereto, and in which said mechanism includes means for moving said pawl out of engagement with said notches.

3. In a device having driving and driven elements, means for effecting a driving connection between said elements including a movable member and connections adapted to transmit to said member forces representative of the torques of said driving and driven elements, and mechanism responsive to relative movement of said driving and driven elements for controlling said means, the improvement in which said driving element is provided with a drum having a plurality of notches and said connections include a pawl pivotally carried by said movable member and adapted to be moved in engagement with one of said notches by the action of centrifugal force of a predetermined minimum amount, and in which said mechanism includes means for moving said pawl out of engagement with said notches.

4. In a device having driving and driven elements, the combination therewith of a drum fixed to said driving element and provided with a plurality of notches, a movable member loosely splined on said driven element for limited rotational movement relative thereto, a spring operatively associated with said driven element and said movable member adapted to effect a driving connection therebetween, a driving pawl and a hold back pawl each pivotally mounted on said member and adapted to engage said notches to effect a driving connection between said member and drum, control mechanism responsive to relative movement of said driving and driven elements for moving said pawls out of engagement with said notches, and means for moving said pawls in engagement with said notches.

5. In a device having driving and driven elements, the combination therewith of a drum fixed to said driving element and provided with a plurality of notches, a movable member loosely splined on said driven element for limited rotational movement relative thereto, a spring operatively associated with said driven element and said movable member adapted to effect a driving connection therebetween, a driving pawl and a hold back pawl each pivotally mounted on said member and adapted to engage said notches to effect a driving connection between said member and drum, control mechanism responsive to relative movement of said driving and driven elements for moving said pawls out of engagement with said notches, said driving pawl being moved in engagement with one of said notches by the action of centrifugal force, means preventing movement of said driving pawl in engagement with one of said notches when said centrifugal force is less than a predetermined amount, and means for moving said hold back pawl in engagement with one of said notches.

6. A device having driving and driven elements, a movable member, means providing a driving connection from said driving element to said movable member, means providing a driving connection from said movable member to said driving element operative when said driven element tends to act as a driving member, means acting to effect said driving connections, control mechanism responsive to relative movement of said driving and driven elements for disconnecting said driving connections, and means for providing a driving connection between said movable member and said driven element.

7. A device having driving and driven elements, a movable member loosely splined on said driven element for limited rotational movement relative thereto, means providing a driving connection from said driving element to said movable member, means providing a driving connection from said movable member to said driving element operative when said driven element tends to act as a driving member, means acting to effect said driving connections, control mechanism responsive to relative movement of said driving and driven elements for disconnecting said driving connections, and a spring operatively associated with said driven element and said movable member adapted to effect a driving connection therebetween.

8. A device having driving and driven elements, a movable member, means responsive to the action of centrifugal force of predetermined minimum amount for providing a driving connection from said driving element to said movable member, means providing a driving connection from said movable member to said driving element operative when said driven element tends to act as a driving member, means acting to effect said driving connection from said movable member to said driving element, control mechanism responsive to relative movement of said driving and driven elements for disconnecting said driving connections, and means for providing a driving connection between said movable member and said driven element.

9. A device having driving and driven elements, a movable member loosely splined on said driven element for limited rotational movement relative thereto, means responsive to the action of centrifugal force of predetermined amount for providing a driving connection from said driving element to said movable member, means providing a driving connection from said movable member to said driving element when said driven element tends to act as a driving member, means acting to effect said driving connection from said movable member to said driving element, control mechanism responsive to relative movement of said driving and driven elements for disconnecting said driving connections, and a spring operatively associated with said driven element and said movable member adapted to effect a driving connection therebetween.

CARROLL H. RICHARDS.

REFERENCES CITED

The following references are of record in the file of this patent:

UNITED STATES PATENTS

| Number | Name | Date |
|---|---|---|
| 1,733,002 | Blackstock | Oct. 22, 1929 |
| 1,947,374 | Blackstock | Feb. 13, 1934 |
| 1,969,661 | Nardone | Aug. 7, 1934 |
| 2,012,087 | Nardone | Aug. 20, 1935 |
| 2,039,451 | Richards | May 5, 1936 |
| 2,202,271 | Sinclair et al. | May 28, 1940 |
| 2,271,548 | Gouldbourn et al. | Feb. 3, 1942 |
| 2,290,696 | Margolis | July 21, 1942 |
| 2,341,946 | Richards | Feb. 15, 1944 |